UNITED STATES PATENT OFFICE.

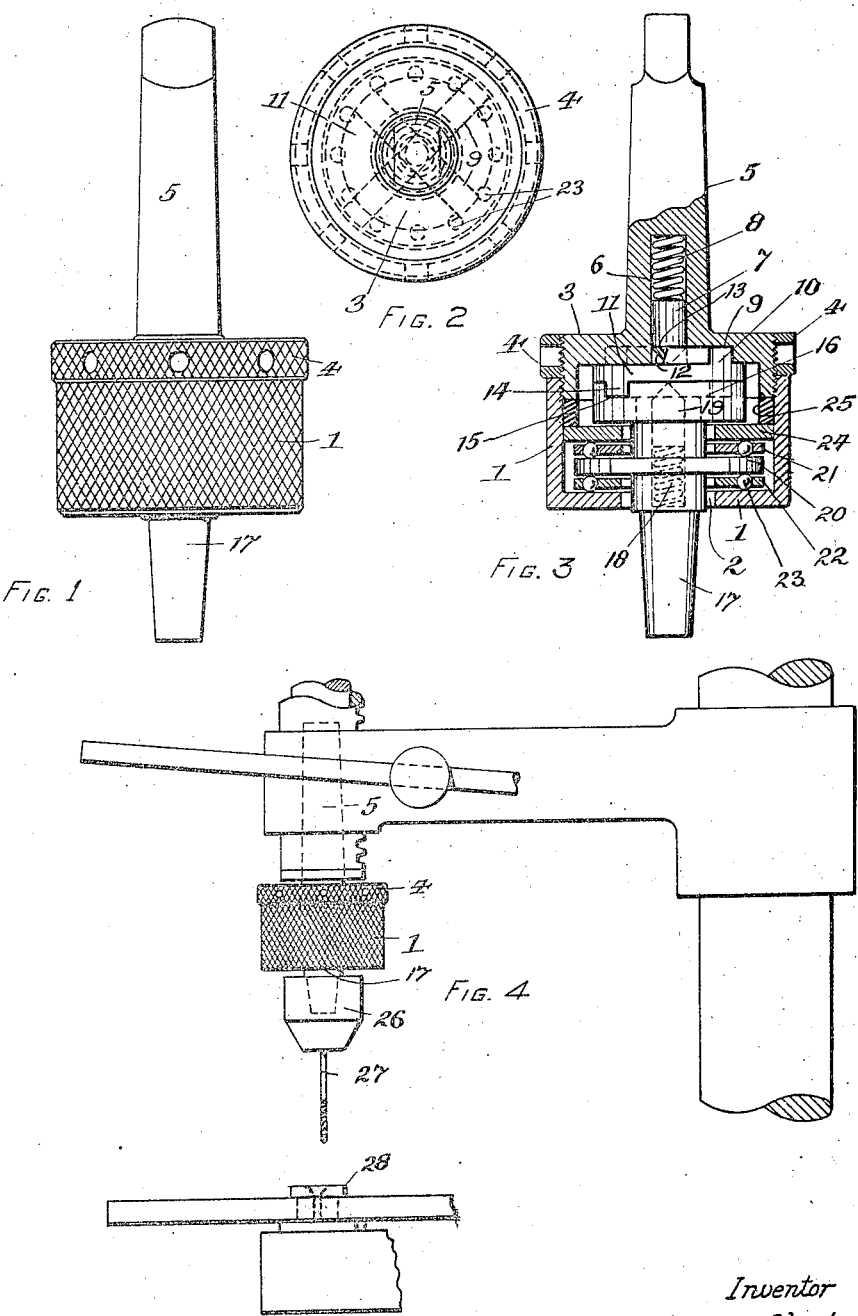

CHARLES JEROME CLARK, OF LAKEWOOD, OHIO.

TOOL-HOLDER.

1,398,679.

Specification of Letters Patent.  Patented Nov. 29, 1921.

Application filed January 25, 1921. Serial No. 439,846.

*To all whom it may concern:*

Be it known that I, CHARLES JEROME CLARK, a citizen of the United States, residing at Lakewood, in the county of Cuyahoga and State of Ohio, have invented certain new and useful Improvements in Tool-Holders, of which the following is a specification.

This invention pertains to tool holders and more particularly to that class wherein the holder proper (or the element by which it is carried) may partake of a lateral movement while still being driven by the operating means. In other words the tool be it a drill, tap, or reamer, may while rotating and accomplishing work, stand off center with reference to the driving element.

The main object of the present invention is to provide a floating tool holder which, by reason of its construction, will be so sensitive that it may, for instance, be employed with drills of small diameter, the arrangement of the parts being such that a slight touch of the drill point upon the jig or guide bushing will cause the drill to be moved laterally while still maintaining its proper angular relation to the work.

I am aware that various floating or self-alining tool holders have heretofore been proposed and no broad claim is made to such a structure; the arrangement hereinafter set forth, however, is highly sensitive and capable of performing work which has not so far as I am advised been accomplished with tool holders of the type under consideration.

The holder forming the basis of my invention is illustrated in the annexed drawings wherein:—

Figure 1 is a side elevation of the holder, the tool chuck being omitted.

Fig. 2 a top plan view thereof,

Fig. 3 a vertical sectional elevation, and

Fig. 4 a side elevation of a portion of a drill press with my tool applied thereto, a jig and work holder.

In the drawings, 1 denotes a cup shaped element or housing having a centrally disposed opening 2 formed in the bottom thereof. The upper end of said member is internally threaded and a cap piece or head 3 is screwed therein, a lock nut 4 being provided to hold the parts against relative movement once they are brought to their desired adjusted position. A tapered shank 5 formed integrally with the head extends upwardly therefrom, the shank being provided with a longitudinally disposed bore or recess 6 forming the housing for a centering pin 7 and a spring 8 which tends at all times to force the pin downwardly. The inner face of the head 3 is provided with a transversely disposed slot 9 into which projects the upper tongue or rib 10 of an Oldham coupling element 11. Said rib is provided at its midlength with an inverted cone shaped seat or socket 12 into which extends the coned end 13 of pin 7.

The lower tongue or rib 14 of the coupling element takes into a slot 15 formed in a head or enlargement 16 formed as an integral part or secured to the upper end of a spindle 17. Said spindle is counterbored or formed with a socket or recess in which is mounted a spring 18 and a second centering pin 19, the tapered end of the latter extending into a conical seat or recess formed centrally of the lower cross rib 14.

The spindle is of such diameter that it passes freely through opening 2; in other words the opening is materially larger than the spindle so that the latter may shift laterally without contacting the walls of the opening. A thrust plate or flange 20 is secured to or formed integrally with the spindle 17 and located on opposite sides thereof are two rings 21 and 22 respectively, each carrying a series of balls 23. The balls carried by the lower ring bear against the bottom of the cup-shaped body 1 and the overlying thrust plate, while those carried by the upper ring 21 contact the upper face of the thrust plate and an overlying annular shaped bearing element 24.

Said bearing element is held in place by a ring 25 interposed between the element and the lower depending edge of the cap piece or head 3. By screwing the head in or out, as the case may be, proper adjustment of the parts may be effected after which the lock nut 4 is turned home to secure the parts in place.

Spindle 17 is designed to have attached or secured to thereto a chuck as 26, Fig. 4, in which view the holder as above described is shown with its shank 5 in associated working relation with a drill press. The drill designated by 27 carried by the chuck is shown as standing out of line with the jig bushing 28, this by reason of the fact that the workman has failed to properly position the jig; a condition which will frequently occur in actual practice.

The drill upon descending contacts the inclined or curved wall of the bushing and will move bodily into line with the opening in the bushing through which it passes.

During such lateral movement the drill maintains its vertical position with reference to the jig; in other words there is no tipping or canting of the drill. Such facility for easy movement and prevention of canting is brought about through the construction as above set forth, the Oldham coupling being relieved of any pressure due to the presence of the thrust bearings. Furthermore by the provision of the two oppositely disposed spring actuated centering pins working upon opposite sides of the coupling element 11 an equilibrium of centering forces is exerted upon said element as it shifts or floats around to accommodate itself to the off center position of the spindle element 17 and its allied parts.

While the holder as above set forth is especially adapted for light drilling it may, as above noted, be employed equally as well upon heavier work such as tapping and reaming.

It is manifest that the ring 25 may be omitted and the head 3 may be of such length as to directly contact the element 24 thus taking the place of said ring.

What is claimed is:—

1. In a tool holder of the floating type, the combination of a spindle; a driving element therefor; an Oldham coupling interposed between the same; means acting upon said coupling and independent of the driving connections thereof to aline the spindle and driving element; and a thrust bearing coöperating with the spindle to relieve the coupling from pressure exerted upon the spindle.

2. In a tool holder of the floating type, the combination of a cup-shaped shell having an opening in its lower wall; a spindle extending through said opening; a bearing plate rotatable with the spindle and located within the shell; a second bearing plate located within the shell; balls located between the said two plates and between the first plate and the lower wall of the shell; a head on the spindle and rotatable therewith; a shank having a head the latter being secured within the upper end of the cup-shaped shell; a coupling element of the Oldham type interposed between said heads; and means acting constantly to center the element and to consequently aline the shank and spindle.

3. In a tool holder of the floating type, the combination of a cup-shaped shell having an opening in the lower portion thereof; a spindle extending through said opening and out of contact with the walls thereof; a head upon said spindle; a bearing plate carried by the spindle at a point below the head; a shank; a cap piece formed with said shank and threaded into the upper end of the shell; an Oldham coupling interposed between the cap and head; a spring pressed pin mounted in each of the shank and spindle and coöperating with the coupling to center the same; a bearing ring located within the shell below the head; said ring being held in place by the cap piece; and antifriction bearing interposed between said ring and bearing plate, and between the plate and the inner face of the bottom of the cup-shaped member.

4. In a tool holder of the floating type, the combination of a spindle; a driving element therefor, an Oldham coupling interposed between said parts to permit lateral movement of the spindle with reference to the driving element; a bearing member movable with the spindle and independent of the elements of said coupling; and anti-friction bearing elements coöperating with the bearing member, whereby the coupling is relieved from thrust and the spindle rendered sensitive to lateral movement.

In testimony whereof I have signed my name to this specification.

CHARLES JEROME CLARK.